United States Patent
Ekladyous et al.

(10) Patent No.: US 10,271,399 B1
(45) Date of Patent: Apr. 23, 2019

(54) REAR VEHICLE LIGHTING SYSTEM AND METHOD

(71) Applicant: Ford Global Technologies LLC, Dearborn, MI (US)

(72) Inventors: Albert Ekladyous, Shelby Township, MI (US); Ghassan E. Mady, Plymouth, MI (US); Lisa Hohmann, Clinton Township, MI (US); Arun Kumar, Farmington Hills, MI (US); Kevin Woycik, Brighton, MI (US); Kelley Maria Adams-Campos, Ferndale, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/015,274

(22) Filed: Jun. 22, 2018

(51) Int. Cl.
*B60Q 1/30* (2006.01)
*B60Q 1/44* (2006.01)
*B60Q 1/38* (2006.01)
*H05B 33/08* (2006.01)
*B60Q 1/26* (2006.01)
*B60Q 1/46* (2006.01)

(52) U.S. Cl.
CPC ....... *H05B 33/0857* (2013.01); *B60Q 1/2607* (2013.01); *B60Q 1/30* (2013.01); *B60Q 1/38* (2013.01); *B60Q 1/44* (2013.01); *B60Q 1/46* (2013.01); *B60Q 2400/20* (2013.01)

(58) Field of Classification Search
CPC .... H05B 33/0857; B60Q 1/46; B60Q 1/2607; B60Q 1/38; B60Q 1/44; B60Q 1/30; B60Q 2400/20
USPC .......................................... 315/77
See application file for complete search history.

(56) References Cited

U.S. PATENT DOCUMENTS

| 7,342,707 | B2 | 3/2008 | Roberts et al. |
| 8,588,997 | B2 | 11/2013 | Pribula et al. |
| 8,721,145 | B2 | 5/2014 | Peltonen |
| 9,844,117 | B2 | 12/2017 | Lombardi et al. |
| 2014/0252949 | A1* | 9/2014 | Ko ......................... H05B 37/02 315/77 |
| 2015/0117048 | A1* | 4/2015 | Huang ................. B60Q 1/2607 362/541 |
| 2016/0107564 | A1 | 4/2016 | Sola Gomfaus et al. |

FOREIGN PATENT DOCUMENTS

DE         102014110776 A1    2/2015

* cited by examiner

*Primary Examiner* — Daniel D Chang
(74) *Attorney, Agent, or Firm* — Carlson, Gaskey & Olds, P.C.

(57) ABSTRACT

This disclosure relates to a lighting system for a rear of a motor vehicle and a corresponding method. In particular, an example lighting system includes a first rear combination lamp and a second rear combination lamp, the first and second rear combination lamps each including a first lighting section configured to illuminate a first color and a second lighting section configured to illuminate one of an second color and a third color. The system further includes a controller configured to selectively illuminate each of the first and second lighting sections.

20 Claims, 2 Drawing Sheets

REAR VEHICLE LIGHTING SYSTEM AND METHOD

TECHNICAL FIELD

This disclosure relates to a lighting system for a rear of a motor vehicle and a corresponding method.

BACKGROUND

Motor vehicles are known to include rear lighting systems including a number of lighting and signaling devices. Such devices include conspicuity lamps which are generally operable to increase the visibility of the vehicle, allowing other drivers and pedestrians to see the vehicle's presence and the driver's intentions regarding direction of travel. Known rear lighting systems include left and right rear lamps at opposite sides of the vehicle and a center high-mount stop lamp (CHMSL) between the rear lamps. In some systems, the left and right rear lamps are configured to perform multiple functions, including being operable as tail lamps, brake lamps (or, stop lamps), turn signals, and reverse lamps. As such, the left and right rear lamps are sometimes referred to as rear combination lamps.

SUMMARY

A lighting system for a motor vehicle according to an exemplary aspect of the present disclosure includes, among other things, a first rear combination lamp and a second rear combination lamp. The first and second rear combination lamps each include a first lighting section configured to illuminate a first color and a second lighting section configured to illuminate one of an second color and a third color. The system further includes a controller configured to selectively illuminate each of the first and second lighting sections.

In a further non-limiting embodiment of the foregoing lighting system, the first color is a red color, the second color is an amber color, and the third color is a white color.

In a further non-limiting embodiment of any of the foregoing lighting systems, each of the first lighting sections includes a plurality of red light emitting diodes (LEDs), and each of the second lighting sections includes a plurality of bi-color LEDs configured to illuminate one of an amber color and a white color.

In a further non-limiting embodiment of any of the foregoing lighting systems, each of the first and second rear combination lamps consist of only two lighting sections.

In a further non-limiting embodiment of any of the foregoing lighting systems, the controller is configured to selectively illuminate the first lighting sections of the first and second rear combination lamps to indicate a braking operation.

In a further non-limiting embodiment of any of the foregoing lighting systems, during a hazard flashers operation, the controller is configured to selectively illuminate the second lighting sections of the first and second rear combination lamps in the second color.

In a further non-limiting embodiment of any of the foregoing lighting systems, when the motor vehicle is in a gear other than reverse, the controller is configured to selectively illuminate the second lighting sections of the first and second rear combination lamps in the second color to indicate a turn signal.

In a further non-limiting embodiment of any of the foregoing lighting systems, when the motor vehicle is in a reverse gear, the controller is configured to selectively illuminate the second lighting sections of the first and second rear combination lamps in the third color.

In a further non-limiting embodiment of any of the foregoing lighting systems, at all times when the motor vehicle is in a reverse gear, the controller is configured to selectively illuminate at least one of the second lighting sections such that a white light is emitted from the motor vehicle.

In a further non-limiting embodiment of any of the foregoing lighting systems, when the motor vehicle is in a reverse gear and during a hazard flashers operation, the controller is configured to periodically alternate between illuminating the second lighting section of the first rear combination lamp in one of the second and third colors and illuminating the second lighting section of the second rear combination lamp in the other of the second and third colors.

In a further non-limiting embodiment of any of the foregoing lighting systems, when the motor vehicle is in a reverse gear while a turn signal is activated, the controller is configured to periodically illuminate the second lighting section of one of the first and second rear combination lamps in the second color to indicate a turn signal and to illuminate the second lighting section of the other of the first and second rear combination lamps in a white color to indicate the motor vehicle is in a reverse gear.

In a further non-limiting embodiment of any of the foregoing lighting systems, the first rear combination lamp is adjacent a right side of the vehicle and the second rear combination lamp is positioned adjacent a left side of the vehicle.

A method according to an exemplary aspect of this disclosure includes, among other things, selectively illuminating a rear lighting system of a motor vehicle. The rear lighting system includes a first rear combination lamp and a second rear combination lamp. The first and second rear combination lamps each include a first lighting section configured to illuminate a first color and a second lighting section configured to illuminate one of an second color and a third color.

In a further non-limiting embodiment of the foregoing method, the method includes illuminating the first lighting sections of the first and second rear combination lamps to indicate a braking operation.

In a further non-limiting embodiment of any of the foregoing methods, the method includes illuminating the second lighting sections of the first and second rear combination lamps in the second color during a hazard flashers operation.

In a further non-limiting embodiment of any of the foregoing methods, the method includes illuminating the second lighting sections of the first and second rear combination lamps in the second color to indicate a turn signal when the motor vehicle is in a gear other than reverse, and illuminating the second lighting sections of the first and second rear combination lamps in the third color when the motor vehicle is in a reverse gear.

In a further non-limiting embodiment of any of the foregoing methods, the method includes illuminating at least one of the second lighting sections such that a white light is emitted from the motor vehicle at all times when the motor vehicle is in a reverse gear.

In a further non-limiting embodiment of any of the foregoing methods, the method includes periodically alternating between illuminating the second lighting section of the first rear combination lamp in one of the second and third colors and illuminating the second lighting section of the second rear combination lamp in the other of the second and third colors when the motor vehicle is in a reverse gear during a hazard flashers operation.

In a further non-limiting embodiment of any of the foregoing methods, the method includes periodically illuminating the second lighting section of one of the first and second rear combination lamps in the second color to indicate a turn signal and illuminating the second lighting section of the other of the first and second rear combination lamps in a white color when the motor vehicle is in a reverse gear while a turn signal is activated.

In a further non-limiting embodiment of any of the foregoing methods, the first color is a red color, the second color is an amber color, and the third color is a white color.

DETAILED DESCRIPTION

This disclosure relates to a lighting system for a rear of a motor vehicle and a corresponding method. In particular, an example lighting system includes a first rear combination lamp and a second rear combination lamp, the first and second rear combination lamps each including a first lighting section configured to illuminate a first color and a second lighting section configured to illuminate one of an second color and a third color. The system further includes a controller configured to selectively illuminate the each of the first and second lighting sections.

The disclosed system and method allows one to use the same lighting system in different global jurisdictions. As such, this disclosure reduces manufacturing and assembly costs, and also provides lamps of a reduced weight and reduced packaging size. In particular, because common rear combination lamps may be used in different global jurisdictions, this disclosure eliminates the need for separate designs, tooling, etc., which are otherwise required when making multiple types of rear combination lamps. These and other benefits will be appreciated from the below.

Figure 1:
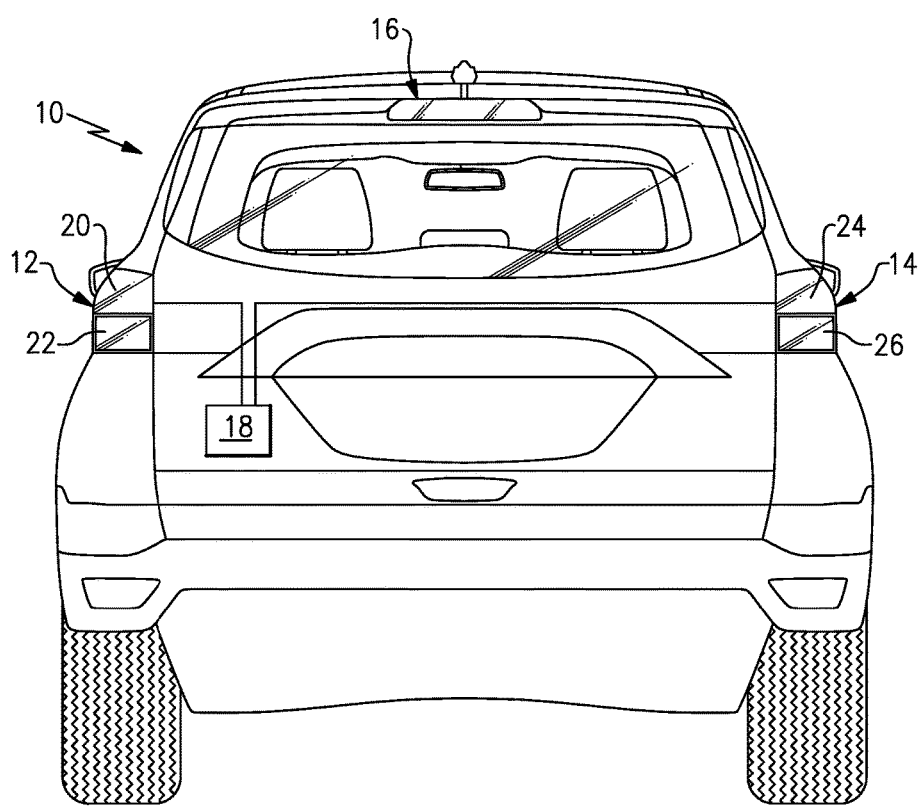
FIG. 1 is a rear view of a motor vehicle including two rear combination lamps.

FIG. 1 illustrates a motor vehicle ("vehicle") 10 from a rear view. In this example, the vehicle 10 is a sport utility vehicle (SUV), but it should be understood that this disclosure is not limited to any particular vehicle type, and extends to cars, trucks (including pickup trucks), vans, etc.

The vehicle 10 includes a plurality of lamps, such as conspicuity lamps, in this example. Conspicuity lamps are lamps that make a vehicle conspicuous and visible with respect to its presence, position, direction of travel, change in direction, etc. Among other lamps, the vehicle 10 includes a first rear combination lamp 12, a second rear combination lamp 14, and a center high-mount stop lamp 16 (CHMSL).

The first rear combination lamp 12 is a left rear combination lamp, in this example, because it is arranged adjacent the left side of the vehicle 10, and the second rear combination lamp 14 is a right rear combination lamp because it is arranged adjacent the right side of the vehicle 10. The first and second rear combination lamps 12, 14 are configured to emit different colors of light to signal different vehicle operations.

The lamps are electrically coupled to a controller 18. The controller 18 is shown schematically in FIG. 1. It should be understood that the controller 18 could be part of an overall vehicle control module, such as a vehicle system controller (VSC), or may be part of a body control module (BCM). Alternatively, the controller 18 may be a stand-alone controller separate from the VSC and the BCM. Further, the controller 18 may be programmed with executable instructions for interfacing with and operating the various components of the vehicle 10. The controller 18 additionally includes hardware and software, and further includes a processing unit and non-transitory memory for executing the various control strategies and modes of the vehicle system.

Among other functions, the controller 18 is configured to selectively illuminate the first and second rear combination lamps 12, 14 and the CHMSL 16. In particular, in this example, each of the first and second rear combination lamps 12, 14 include two lighting sections ("sections"), which may also be referred to as lighting compartments. The sections may be distinct sections with walls or other dividers separating lights of different colors, for example. The sections may also be provided by separate lighting subassemblies within the combination lamps.

In a particular example, the first and second rear combination lamps 12, 14 each consist of only two lighting sections. For instance, in the example of FIG. 1, the first rear combination lamp 12 includes a first section 20 and a second section 22. Likewise, the second rear combination lamp 14 includes a first section 24 and a second section 26. Limiting the rear combination lamps to only two lighting sections reduces the cost of manufacturing the rear combination lamps, and, as will be appreciated from the below, still meets the lighting requirements of various global jurisdictions.

In the illustrated example, the first sections 20, 24 are above (relative to FIG. 1) the second sections 22, 26. This disclosure extends to lighting sections that are arranged in other ways, such as being side-to-side, etc. This disclosure also extends to arrangements where the second sections 22, 26 are above the first sections 20, 24, for example.

Each of the first and second sections 20, 22, 24, 26 includes a plurality of lights, such as light emitting diodes (LEDs), each of which can be individually activated by the controller 18. In this example, the first sections 20, 24 include lights configured to emit a first color, and the second sections 22, 26 include lights configured to alternatively emit a second or third color. In one particular example, the first sections 20, 24 include a plurality of LEDs configured to emit a red color, whereas the second sections 22, 26 include a plurality of bi-color LEDs configured to emit either an amber or a white color. The controller 18 is operable to activate each of the first and second sections 20, 22, 24, 26 individually, and, with respect to the second sections 22, 26, the controller 18 is configured to illuminate the second sections 22, 26 such that they emit one of the two colors (i.e., amber or white). Arranging the lights within the first and second sections, as discussed, ensures that light intensity and clarity is enhanced. In particular, providing the second sections 22, 26 with bi-color LEDs increases light intensity and clarity compared to a lighting section that includes half white LEDs and half amber LEDs, for example. While bi-color LEDs have been mentioned above, this disclosure extends to other multi-color LEDs, such as tri-color LEDs. An example tri-color LED may be configured to emit red, green, and blue colors, as examples, which allows for any color (including white and amber) to be emitted by mixing the colors from the tri-color LED.

In use, the controller 18 selectively illuminates the first and second rear combination lamps 12, 14 and the CHMSL 16 to perform various signaling functions. The controller 18 is configured to selectively illuminate the first sections 20, 24 to indicate a braking operation. That is, when a user depresses a brake pedal of the vehicle 10, the controller 18 illuminates the first sections 20, 24 and the CHMSL 16 such that they emit a red color.

Figure 2:
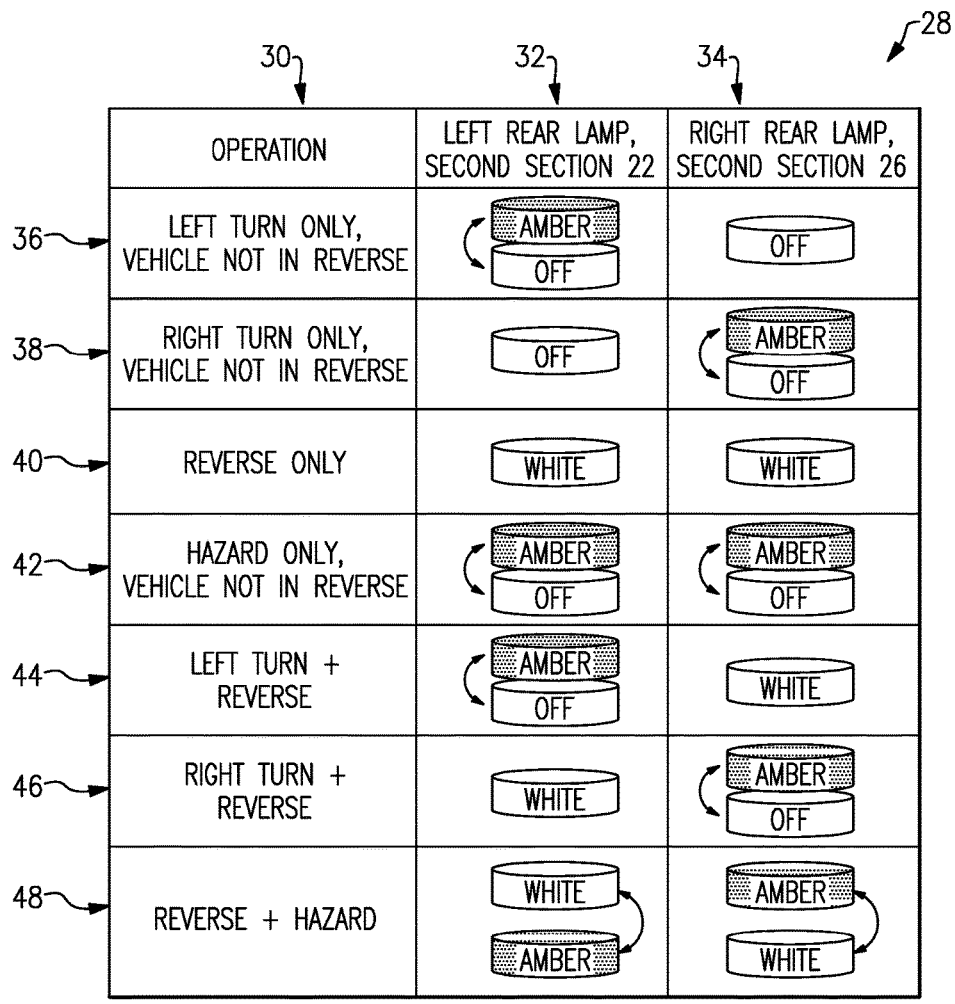
FIG. 2 is a table schematically illustrating one example control scheme in which a controller selectively illuminates the rear combination lamps to perform a number of signaling functions.

The second sections 22, 26 of the first and second rear combination lamps 12, 14 are also selectively activated by the controller 18. FIG. 2 is a table schematically representing one example control scheme in which the controller 18 selectively activates the second sections 22, 26 to perform various signaling functions. In this sense, FIG. 2 is representative of an example method according to this disclosure.

In FIG. 2, the table 28 includes a plurality of columns 30, 32, 34. The first column lists a plurality of operations during which the controller 18 is operable to selectively activate the second sections 22, 26 in accordance with the second and third columns 32, 34, which represent the behavior of the second sections 22, 26, respectively, during the listed operations. While the first sections 20, 24 are not represented in FIG. 2, it should be understood that these sections may be selectively activated during any of the listed operations if braking occurs, for example. FIG. 2 only includes the sections 22, 26 for ease of reference.

Row 36 is representative of a first operation, in which the vehicle 10 is in a gear other than reverse, such as park or drive, and a user has activated a left turn signal. In this case, the controller 18 periodically illuminates the second section 22 of the first (left) rear combination lamp 12 such that it flashes between an amber color (represented by the cell labeled "AMBER") and an off state (represented by the cell labeled "OFF"). During this operation, the second section 26 remains in an off state. Row 38 represents a similar operation, wherein the user has activated a right turn signal. In response, the controller 18 periodically illuminates the second section 26 of the second (right) rear combination lamp 14 such that it flashes between an amber color and an off state while keeping the second section 22 off.

In a third operation, represented by row 40, the vehicle 10 is in a reverse gear. As such, the controller 18 is configured to illuminate both the second sections 22, 26 such that they emit a white color (represented by the cells labeled "WHITE"). In another operation, represented by row 42, the user has activated the hazard flashers. As such, the controller 18 is configured to periodically illuminate the second sections 22, 26 such that they flash in sync with one another between an amber color and an off state.

This disclosure also contemplates rarer driving cases, in which a user shifts the vehicle 10 into a reverse gear and operates a turn signal or the hazard flashers. In this disclosure, as will be appreciated from the below discussion of rows 44, 46, and 48, the controller 18 is configured to selectively illuminate at least one of the second sections 22, 26 such that a white light is emitted from the vehicle 10 at all times when the vehicle 10 is in a reverse gear.

Rows 44 and 46 represent situations in which the vehicle 10 is in a reverse gear while a turn signal is activated. In such situations, the controller 18 is configured to periodically illuminate one of the second sections 22, 26 such that it flashes between amber and an off state, while holding the other of the second sections 22, 26 such that it emits a white color. In this way, at least one of the second sections 22, 26 emits a white light during a turning operation (i.e., when one of the turn signals is activated).

In particular, in row 44, the vehicle 10 is in a reverse gear and the user has activated the left turn signal. As such, the controller 18 causes the second section 22 to flash between amber and off while illuminating the second section 26 such that it emits a white light. Likewise, in row 46, the vehicle 10 is in a reverse gear and the user has activated a right turn signal. Thus, the controller 18 causes the second section 26 to flash between amber and off while illuminating the second section 22 such that it emits a white light.

Row 48 is representative of an operation where the vehicle 10 is in a reverse gear while the hazard flashers are activated (i.e., during a hazard flashers operation). In this example, the second sections 22, 26 essentially share the duties of providing a reverse signal and a hazard flashers signal. In one particular example, the controller 18 is configured to periodically illuminate the second sections 22, 26 such that they flash between amber and white colors out of sync with one another. In other words, while the first section 20 is flashing an amber color (to indicate the hazard flashers are on), the second section 26 is flashing a white color (to indicate the vehicle 10 is in a reverse gear), and vice versa until either the hazard flashers are turned off or the vehicle 10 is shifted out of reverse.

While in this disclosure reference is made to a user activating various operations, such as the user activating a left turn signal, right turn signal, hazard flashers, or shifting gears of the vehicle 10, it should be understood that this disclosure extends to autonomous or semi-autonomous vehicles in which a user does not take such actions.

It should be understood that terms such as "left," "right," "about," "substantially," and "generally" are not intended to be boundaryless terms, and should be interpreted consistent with the way one skilled in the art would interpret those terms. Further, directional terms such as "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A lighting system for a motor vehicle, comprising:
   a first rear combination lamp and a second rear combination lamp each including a first lighting section configured to selectively illuminate a first color and a second lighting section including multi-colored light emitting diodes (LEDs) configured to selectively illuminate the second lighting section one of a second color and a third color; and
   a controller configured to selectively illuminate each of the first and second lighting sections.

2. The lighting system as recited in claim 1, wherein:
   the first color is a red color,
   the second color is an amber color, and
   the third color is a white color.

3. The lighting system as recited in claim 2, wherein:
each of the first lighting sections includes a plurality of red LEDs configured to selectively emit light of a red color; and
the multi-colored LEDs of the second lighting sections are bi-color LEDs configured to selectively emit light of either an amber color or a white color.

4. The lighting system as recited in claim 1, wherein each of the first and second rear combination lamps consist of only two lighting sections.

5. The lighting system as recited in claim 1, wherein the controller is configured to selectively illuminate the first lighting sections of the first and second rear combination lamps to indicate a braking operation.

6. The lighting system as recited in claim 5, wherein, during a hazard flashers operation, the controller is configured to selectively illuminate the second lighting sections of the first and second rear combination lamps in the second color.

7. The lighting system as recited in claim 5, wherein, when the motor vehicle is in a gear other than reverse, the controller is configured to selectively illuminate the second lighting sections of the first and second rear combination lamps in the second color to indicate a turn signal.

8. The lighting system as recited in claim 5, wherein, when the motor vehicle is in a reverse gear, the controller is configured to selectively illuminate the second lighting sections of the first and second rear combination lamps in the third color.

9. The lighting system as recited in claim 5, wherein, at all times when the motor vehicle is in a reverse gear, the controller is configured to selectively illuminate at least one of the second lighting sections such that a white light is emitted from the motor vehicle.

10. The lighting system as recited in claim 9, wherein, when the motor vehicle is in a reverse gear and during a hazard flashers operation, the controller is configured to periodically alternate between illuminating the second lighting section of the first rear combination lamp in one of the second and third colors and illuminating the second lighting section of the second rear combination lamp in the other of the second and third colors.

11. The lighting system as recited in claim 9, wherein, when the motor vehicle is in a reverse gear while a turn signal is activated, the controller is configured to periodically illuminate the second lighting section of one of the first and second rear combination lamps in the second color to indicate a turn signal and to illuminate the second lighting section of the other of the first and second rear combination lamps in a white color to indicate the motor vehicle is in a reverse gear.

12. The lighting system as recited in claim 1, wherein the first rear combination lamp is adjacent a right side of the vehicle and the second rear combination lamp is positioned adjacent a left side of the vehicle.

13. A method, comprising:
selectively illuminating a rear lighting system of a motor vehicle, the rear lighting system including a first rear combination lamp and a second rear combination lamp, the first and second rear combination lamps each including a first lighting section configured to illuminate a first color and a second lighting section including multi-colored light emitting diodes (LEDs) configured to illuminate the second lighting section one of an second color and a third color.

14. The method as recited in claim 13, further comprising:
illuminating the first lighting sections of the first and second rear combination lamps to indicate a braking operation.

15. The method as recited in claim 13, further comprising:
illuminating the second lighting sections of the first and second rear combination lamps in the second color during a hazard flashers operation.

16. The method as recited in claim 13, further comprising:
illuminating the second lighting sections of the first and second rear combination lamps in the second color to indicate a turn signal when the motor vehicle is in a gear other than reverse; and
illuminating the second lighting sections of the first and second rear combination lamps in the third color when the motor vehicle is in a reverse gear.

17. The method as recited in claim 13, further comprising:
illuminating at least one of the second lighting sections such that a white light is emitted from the motor vehicle at all times when the motor vehicle is in a reverse gear.

18. The method as recited in claim 17, further comprising:
periodically alternating between illuminating the second lighting section of the first rear combination lamp in one of the second and third colors and illuminating the second lighting section of the second rear combination lamp in the other of the second and third colors when the motor vehicle is in a reverse gear during a hazard flashers operation.

19. The method as recited in claim 17, further comprising:
periodically illuminating the second lighting section of one of the first and second rear combination lamps in the second color to indicate a turn signal and illuminating the second lighting section of the other of the first and second rear combination lamps in a white color when the motor vehicle is in a reverse gear while a turn signal is activated.

20. The method as recited in claim 13, wherein
the first color is a red color,
the second color is an amber color, and
the third color is a white color.

* * * * *